Jan. 19, 1965   C. P. SCHNEIDER   3,165,975
THREE-DIMENSIONAL DUPLICATING MACHINE
Filed June 12, 1961   6 Sheets-Sheet 2

INVENTOR:
CURT P. SCHNEIDER
BY Gravely, Lieder & Woodruff
ATTORNEYS.

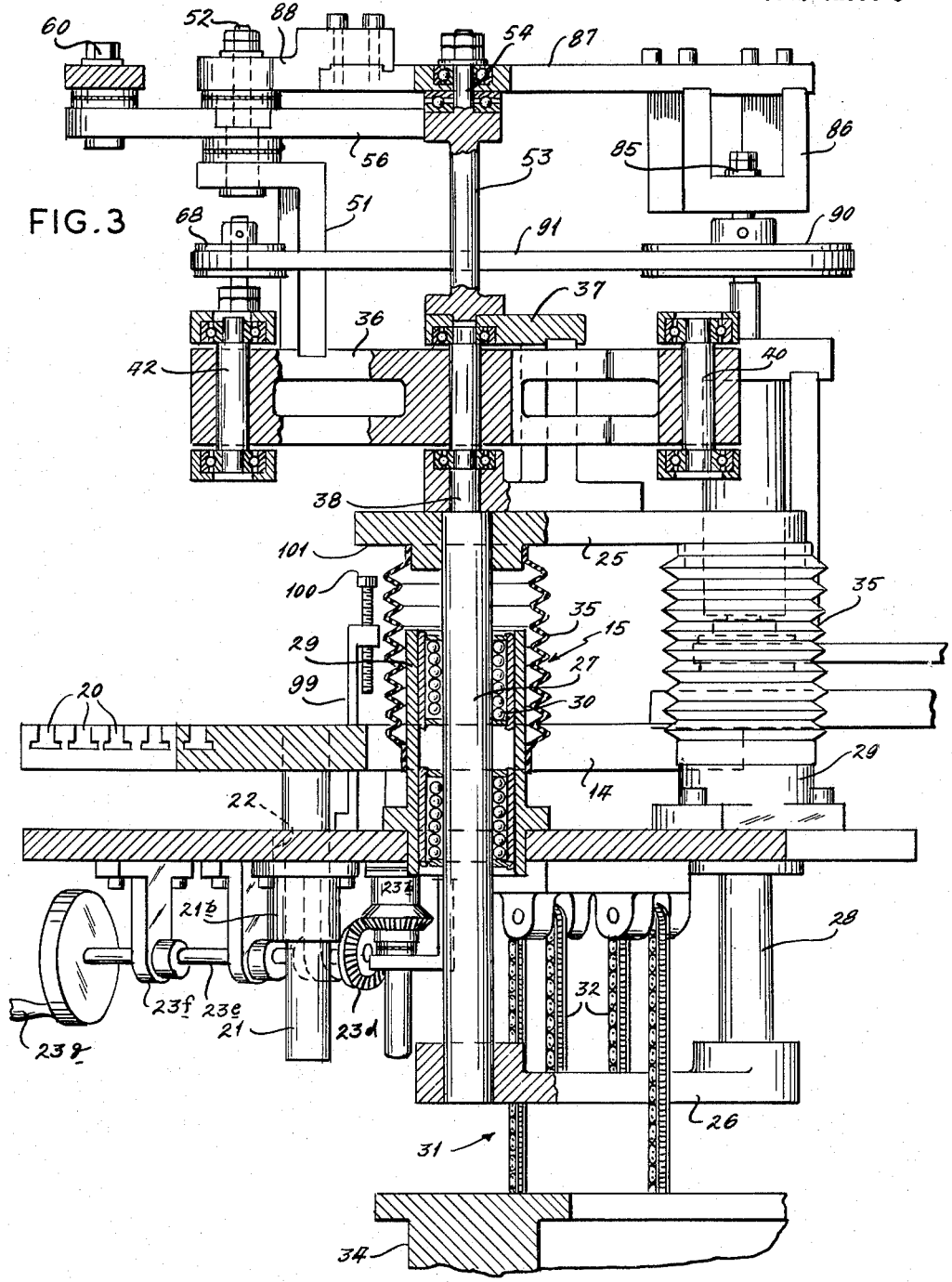

Jan. 19, 1965   C. P. SCHNEIDER   3,165,975
THREE-DIMENSIONAL DUPLICATING MACHINE
Filed June 12, 1961   6 Sheets-Sheet 4
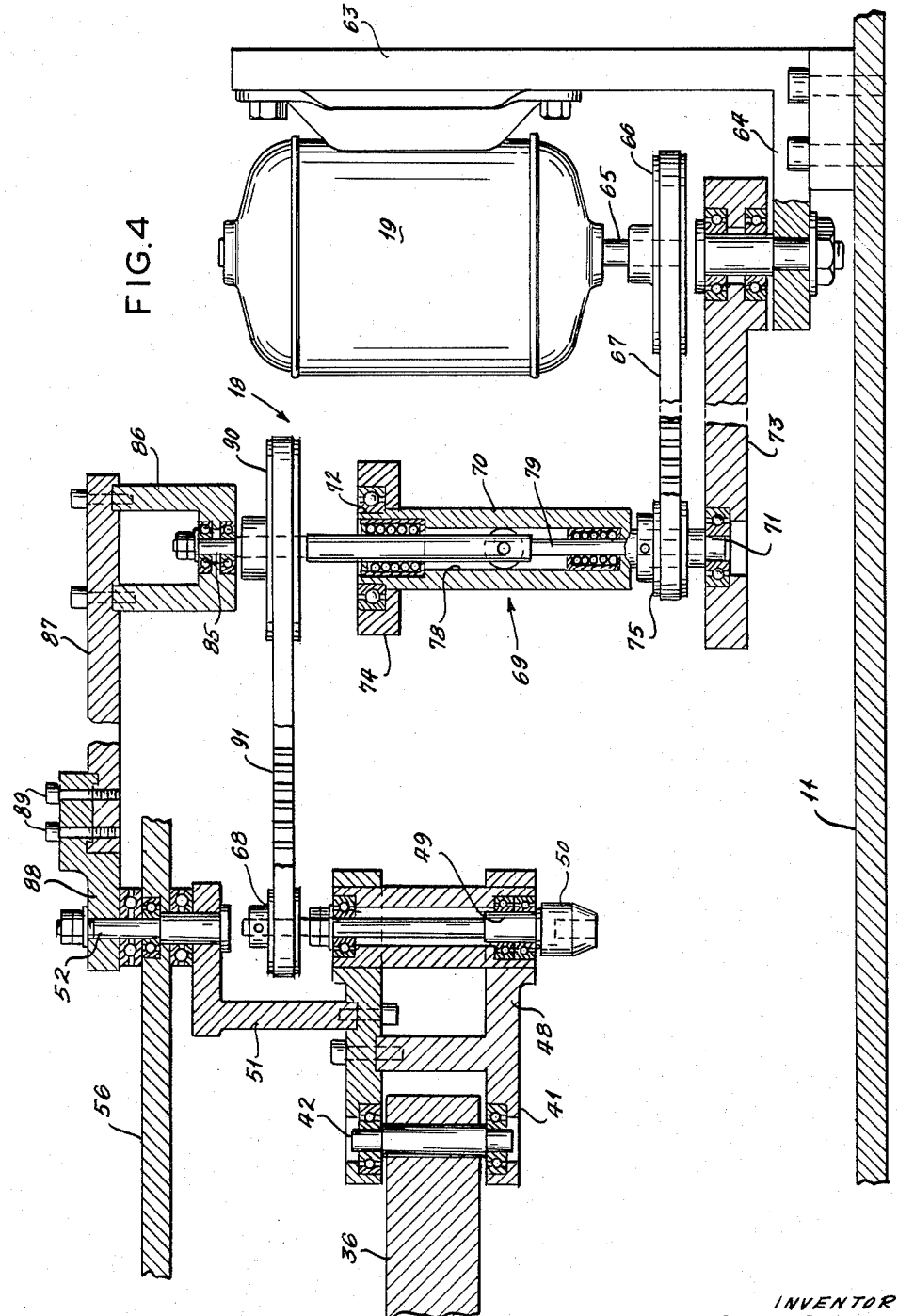
INVENTOR:
CURT P. SCHNEIDER
BY Gravely, Lieder & Woodruff
ATTORNEYS.

Jan. 19, 1965  C. P. SCHNEIDER  3,165,975
THREE-DIMENSIONAL DUPLICATING MACHINE
Filed June 12, 1961  6 Sheets-Sheet 5
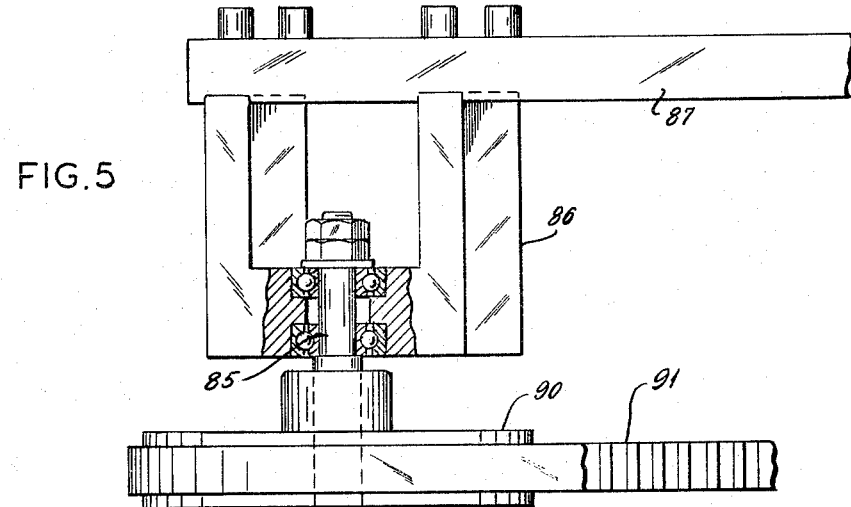
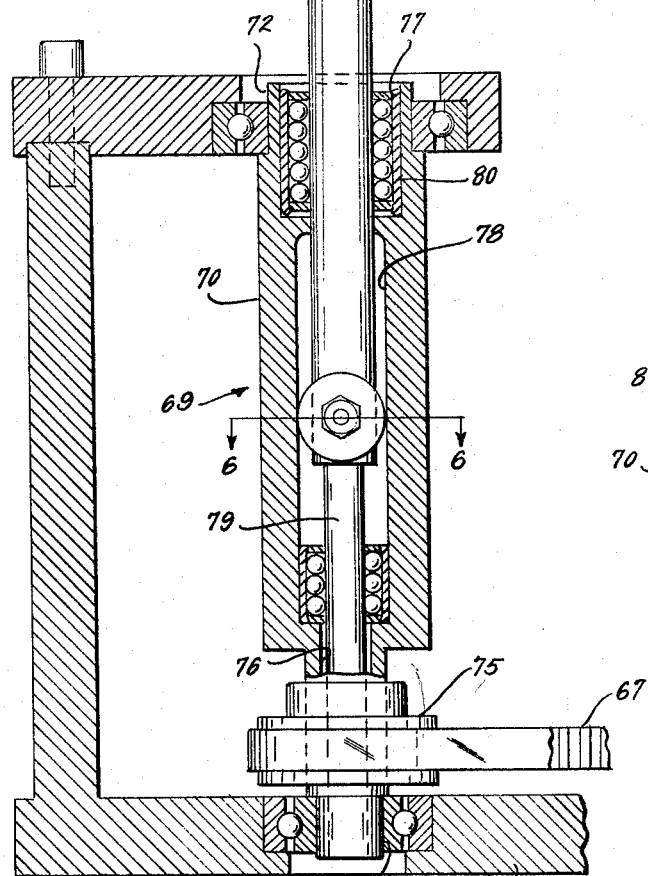
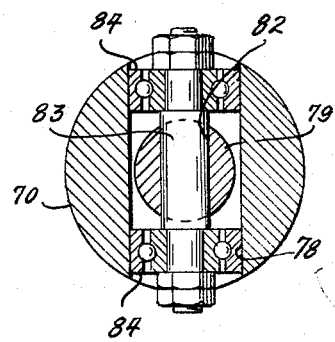
INVENTOR:
CURT P. SCHNEIDER
BY Gravely, Lieder & Woodruff
ATTORNEYS.

Jan. 19, 1965  C. P. SCHNEIDER  3,165,975
THREE-DIMENSIONAL DUPLICATING MACHINE
Filed June 12, 1961  6 Sheets-Sheet 6
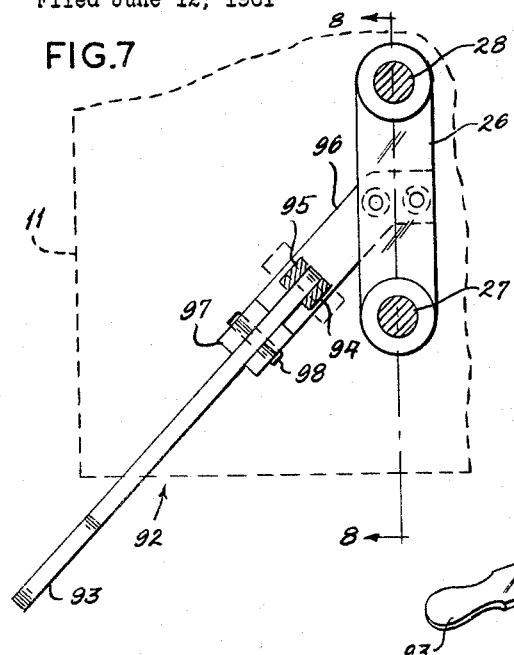
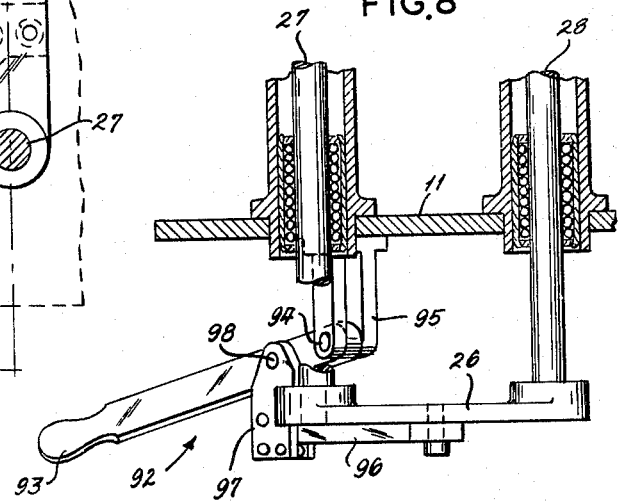
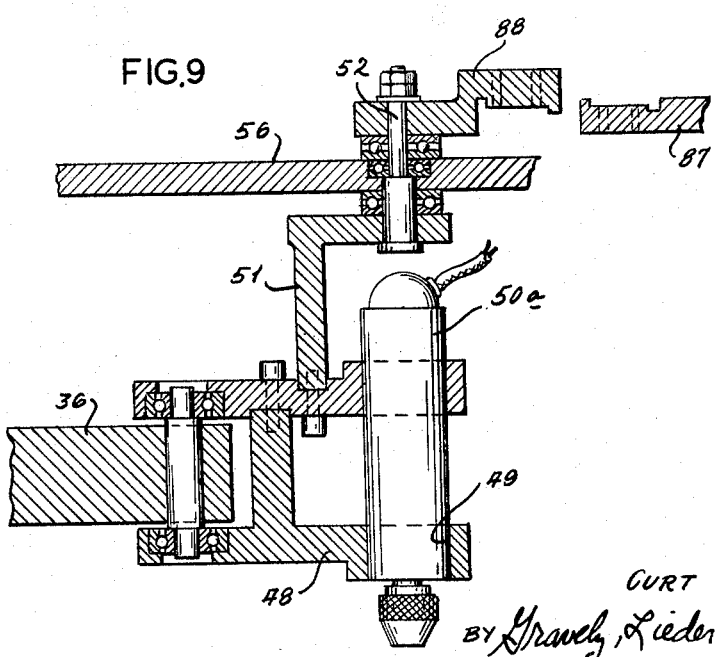
INVENTOR:
CURT P. SCHNEIDER
BY Gravely, Lieder & Woodruff
ATTORNEYS.

United States Patent Office 3,165,975
Patented Jan. 19, 1965

3,165,975
THREE-DIMENSIONAL DUPLICATING MACHINE
Curt P. Schneider, 4133 Dryden, St. Louis, Mo.
Filed June 12, 1961, Ser. No. 116,535
3 Claims. (Cl. 90—13.1)

The present invention relates to a machine for reproducing three-dimensional shapes, and particularly relates to a three-dimensional pantograph duplicating machine having a 1 to 1 reproducing ratio.

Three-dimensional duplicating machines are conventionally used to reproduce a pattern or copy master in a mold for castings, stamping dies and the like. There are numerous machines available for this purpose, but the present machines tend to be very complicated, expensive, difficult to operate, do not normally produce a one to one ratio on the working block, require expensive hand made machined parts in their assembly, and often have vibration and involuntary motion in the arm holding the tracing and cutting elements.

All three-dimensional duplicating devices utilize a rotary spindle to which a cutter is affixed, and a tracer spindle to which a tracer, sometimes called a stylus, is affixed. The stylus is identical in shape and size to the cutter, and in most machines is guided by hand over a copy master in both horizontal and vertical directions. The cutter follows the movements of the tracer and reproduces the copy master in a work block.

In many constructions, the pivot bearings and vertical guide-ways are spaced at a considerable distance from the tracer and cutter spindles. The greater the spacing, the more vibration in the mechanism, particularly when the cutter is roughing a workpiece, and the less efficient is the machine. Vibration is especially prevalent in enlarging machines where the cutter and tracer are on the same side of the pivot point and the cutter is the most removed.

Most duplicating machines utilize from six to eight dovetail slides to make the necessary adjustments, particularly in the work table, to properly align the workpiece relative to the copy master. These dovetail slides are expensive since they must be precisely machined for proper functioning.

Most duplicating machines employ round nylon cord belts with facilities for belt adjustment in conjunction with step pulleys for increasing and decreasing speed. Under heavy loading with small drive pulleys, these belts have a tendency to slip, thereby causing speed and power loss in the cutting spindle.

One of the principal objects of the present invention is to provide a duplicating machine which produces a one to one reproduction ratio and which does not have any substantial vibration between the cutter and tracer spindles.

It is another object of the present invention to provide a machine which obviates to a considerable extent the need for precisely machined parts in its movement assemblies. It is still another object of the present invention to provide a machine in which the work piece is precisely located on the work table by simple gauge blocks, without the use of precision machined work adjusting slides and slide mechanisms.

Another object is to provide a three-dimensional duplicator which eliminates all dovetail slides.

Still another object of the present invention is to provide a novel mechanism for transferring rotative motion in a vertical direction by means of a vertically sliding transmitter arrangement.

Another object is to provide a positive non-slipping drive mechanism.

Another object is to provide a three-dimensional reproducing machine in which the tracer table and the work table are positioned to give an operator at the front of the machine good observation of both the copymaster and the work piece simultaneously.

Another object of the present invention is to provide identically sized parallel tracer and work tables evenly spaced from the center line of the vertical movement, so that an object placed on the tracer table can be located with respect to the side edges thereof by means of gauge blocks and the work piece then can be precisely and similarly located on the work table by using the same gauge blocks.

Still another object is to provide a machine in which vide a machine in which the tracer and cutter spindles are closely positioned to the pivot bearing and the vertical guides and horizontal bearings are close to the tracer and work tables to reduce the normal machine vibrations and increase the ruggedness of the machine.

Still another object is to provide a machine in which the contour tracing is controlled by the operator's right hand and a slidable pivot lever is provided to allow the operator's left hand to follow the vertical irregularities of the model.

Still another object is to provide a machine in which the vertical movement includes vertical guide pins housed in standard cylindrical linear bushings to obviate hand machining of these parts.

Still another object is to provide a pantograph mechanism to control the horizontal movement of the cutter and tracer spindles.

These and other objects and advantages will become apparent hereinafter.

The present invention comprises a three-dimensional duplicating machine in which the tracer and cutter spindles are closely positioned to the pivot center of the machine to reduce vibration and in which both the tracing and cutting tables are equally visible and accessible to the operator. The present invention further comprises a novel mechanism for transmitting rotary motion in a vertical direction.

In the drawings, wherein like numbers refer to like parts wherever they occur,

Figure 1:
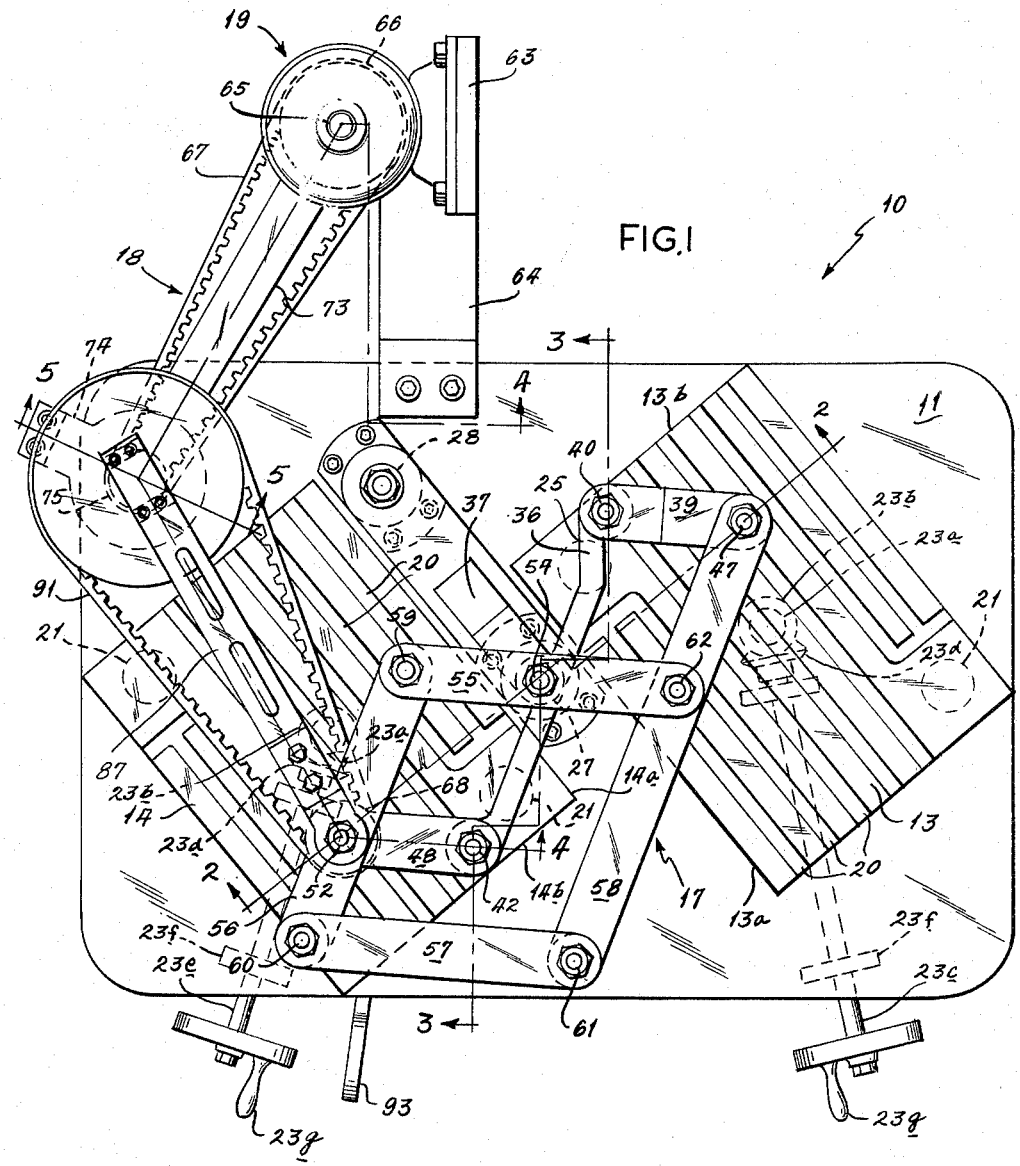
FIG. 1 is a top plan view of the present invention.

FIG. 3 is a partial sectional view taken along line 3—3 of FIG. 1 with a portion of the base and counterbalance broken away, FIG. 4 is a foreshortened partial sectional view taken along line 4—4 of FIG. 1 showing the drive mechanism in detail, FIG. 5 is an enlarged partial sectional view taken along line 5—5 of FIG. 1, FIG. 6 is an enlarged sectional view taken along line 6—6 of FIG. 5, FIG. 7 is a partially broken top plan view of the lever actuating means for the vertical movement, FIG. 8 is a sectional view taken along line 8—8 of FIG. 7, and FIG. 9 is a partially broken sectional view of the cutting housing showing an electric spindle positioned therein.

FIG. 1 shows a top plan view of the present three-dimensional reproducing machine 10 which includes a base 11 mounted on legs 12, a tracing table 13, a work table 14, a vertical movement 15, a horizontal movement 16, a pantograph control mechanism 17 and a drive mechanism 18 powered by a drive means 19.

The tracing table 13 and the work table 14 are provided with longitudinal T shaped slots 20 which retain clamps to fasten a model and a work piece (not shown) respectively to the tables. The tracing table 13 and the work table 14 are aligned parallel to each other and at about a 45° angle to the front of the base 11. This allows an operator standing in front of the machine to have a clear view of both the copy master and the work piece at the same time.

Guide pins 21 are press fitted to the tables 13 and 14 and are vertically slidable in linear ball bearing assemblies 21a (commonly known as ball bushings) mounted in openings 22 in the base 11 and therefore fix the tables 13 and 14 against horizontal movement but allow vertical movement thereof. The linear ball bearing assemblies 21a include a bushing retainer 21b fastened to the base 11, a sleeve 21c and oblong circuits of ball bearings 21d which roll freely in tracks 21e positioned in the sleeve 21c. The use of the linear ball bearing assemblies 21a eliminates the heretofore necessary hand machined dovetail slide adjustment mechanisms, with resultant savings in cost.

Vertical adjusting mechanisms 23 and 24 can be hand actuated to adjust the tables 13 and 14 upwardly or downwardly to compensate for differently sized copy masters. Each of the mechanisms 23 and 24 is identical and only the work table adjusting mechanism 23 will be described in detail. The mechanism 23 includes a stationary screw 23a fastened to the underside of the work table 14, a miter gear 23b rotatively housed in a bracket 23c fixed to the base plate 11, and a coacting one to one miter gear 23d fixed to a shaft 23e rotatively journaled in shaft bearing brackets 23f fixed to the base 11. A graduated hand wheel 23g is fixed to the shaft 23e and a pointer 23h depends from the base 11. The hand wheel 23g is graduated in thousandths of an inch for accurate adjustment of the table 14.

The tables 13 and 14 have inboard side edges 13a and 14a and work locating edges 13b and 14b respectively. The table side edges 13a and 14a are parallel to and equally spaced from the line connecting the centers of the front pin 27 and the rear pin 28. The table work locating edges 13b and 14b are perpendicular to the line connecting the centers of the front pin 27 and the rear pin 28 and are equally spaced to the front and rear of the front pin 27.

The tables 13 and 14 are rectangular and preferably of equal size. In effect, the work table 14 is positioned on the base 11 the same as the tracing table 13 would be, if the table 13 were rotated 180° about the center of the front pin 27. Therefore, when a copy master is positioned on the tracer table 13, it can be located on the table 13 with respect to its distance from the inboard edge 13a and the work locating edge 13b by means of standard gauge blocks.

To produce an exact copy, a work object must be similarly located on the work table 14. The work object is located on the work table 14 by using the same guide blocks as were used to locate the copy master on the tracer table 13. The distance from the tracer table inboard edge 13a to the copy master is laid off from the work table edge 14a to the work object, and the distance from the tracer table locating edge 13b to the copy master is laid off from the work table locating edge 14b to the work object.

Thus, the work object is positioned on the work table 14 exactly 180° from the copy master located on the tracer table 13. The work object is also equally spaced with the copy master from the center of the front pin 27, so that the copy master is exactly reproduced in the work object.

The vertical movement 15 includes a top vertical cross beam 25 above the base 11 and a bottom vertical cross beam 26 below the base 11. The beams 25 and 26 are spaced in vertical alignment by a front pin 27 and a rear pin 28. The pins 27 and 28 are positioned within and are vertically movable in bushing retainers 29 fixed to the base 11. Linear ball bearing assemblies 30 (similar to the assemblies 21a hereinbefore described) housed in the bushing retainers 29 provide relatively frictionless vertical movement for the pins 27 and 28 in the bushing retainers 29. The linear ball bushings 30, the pins 27 and 28 and the bushing retainers 29 all are readily available items of commerce and provide vertical adjustment of the present mechanism without any expensive machining of the relatively movable parts.

A counterbalance mechanism 31 is fixed to the vertical movement 15 and consists of chains 32 anchored to the bottom cross beam 26 and running over sprockets 33 to a counterbalance weight 34 which overcomes the weight of the vertical, horizontal and pantograph mechanisms and the friction in these systems. A dust cap 35 protects the moving parts of the vertical movement 15.

Figure 2:
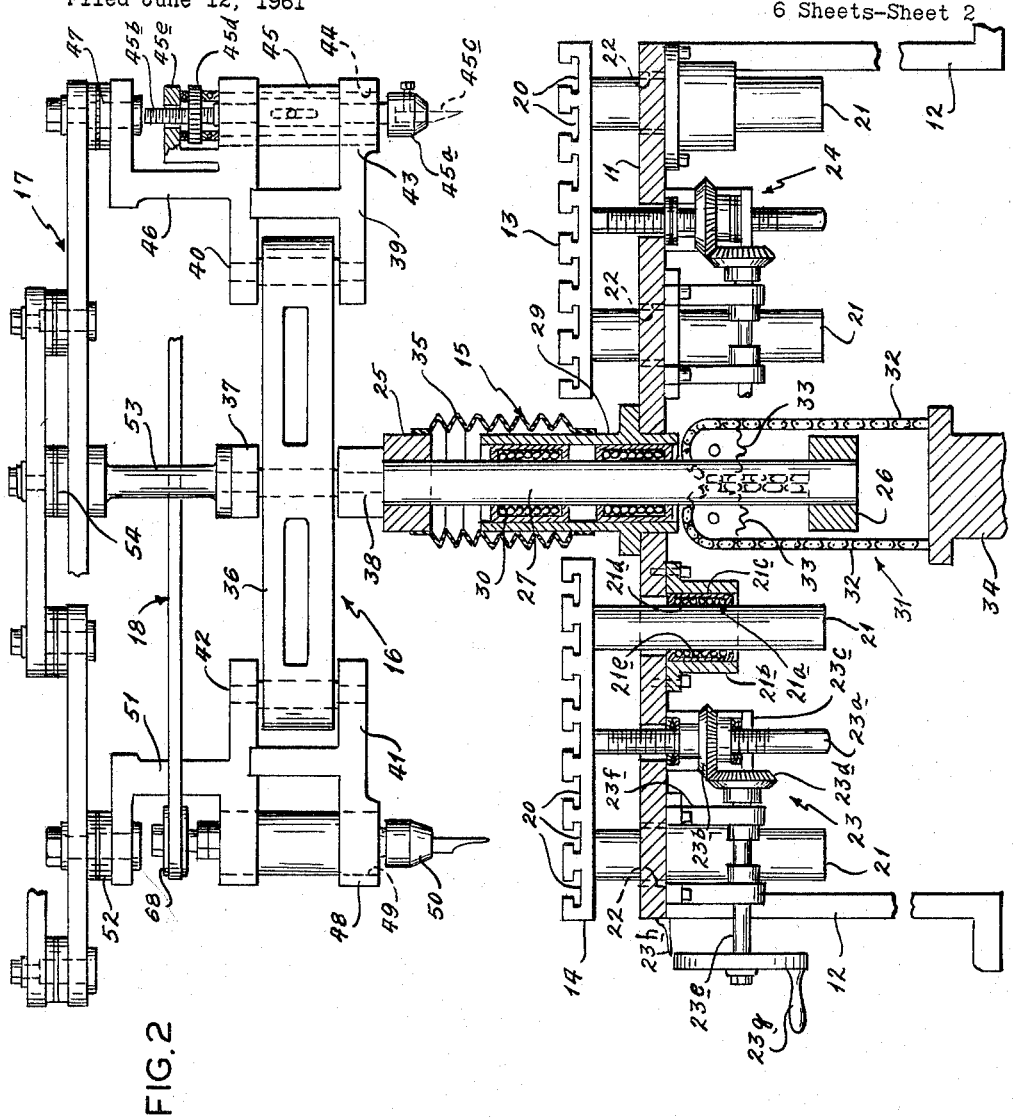
FIG. 2 is a partial sectional view taken along line 2—2 of FIG. 1, showing the base and vertical movement in section and showing the horizontal movement and pantograph mechanism in perspective.

The horizontal movement 16 includes an impeller beam 36 pivotally fixed in a main horizontal bearing bracket 37 which is fixed to the top cross beam 25. The impeller beam 36 is pivoted at its center to the main bearing bracket 37 and the pivot point 38 is vertically aligned with the center of the front pin 27 (FIGS. 2 and 3). A tracer oscillator 39 is pivoted at 40 to the end of the impeller beam 36 positioned over the tracing table 13, and a cutter oscillator 41 is pivoted at 42 to the end of the impeller beam 36 positioned over the cutting table 14.

The tracer oscillator 39 includes a tracer quill housing 43 having an opening 44 adapted to receive a tracer quill 45. A tracer spindle and chuck 45a having a threaded upper end 45b is seated in the tracer quill 45 and is adapted to hold a stylus 45c at the lower end thereof. The tracer spindle 45a is vertically adjusted with respect to the housing 43 by a micrometer nut 45d mounted in a bracket 45e on the housing 43.

A bracket 46 houses a pivotal connection 47 connecting the tracer oscillator 39 to the pantograph mechanism 17. The pivot 47 is vertically spaced from and aligned with the center of the tracer quill receiving opening 44.

The cutter oscillator 41 includes a cutter housing 48 having an opening 49 therein adapted to receive a cutter spindle 50. A bracket 51 houses a pivotal connection 52 connecting the cutter oscillator 41 to the pantograph control mechanism 17. The pivot 52 is vertically spaced from and aligned with the center of the cutter spindle receiving opening 49.

The cutter spindle 50 is adapted to receive a cutter at one end and is connected to the drive mechanism 18 at the other upper end.

The pantograph control mechanism 17 is pivotally fixed to a fulcrum stud 53 at pivot 54. The fulcrum stud 53 is fixed to the top of the main horizontal bearing bracket 37.

As hereinbefore mentioned, the pantograph control mechanism 17 also is pivotally fixed at pivot points 47 and 52 to the horizontal movement 16. Therefore, the horizontal movement 16 and the pantograph control mechanism 17 move in a vertical direction with the vertical movement 15. As the pantograph control mechanism 17 controls and synchronizes the horizontal movement of the tracer spindle 45 and the cutter spindle 50 (as will be more fully explained hereinafter), the present machine provides three-dimensional reproducing action.

The pantograph control mechanism 17 includes members 55, 56, 57 and 58 pivotally connected at pivots 59, 60, 61 and 62 to define a parallelogram. As mentioned, the oscillator brackets 46 and 51 are pivotally connected at points 47 and 52 to the pantograph members 58 and 56 respectively. The linkage of the pantograph mechanism 17 in conjunction with the propeller beam 36 and the oscillator pivotal connections 40 and 42 controls the horizontal motion of the tracer quill 45 and the cutter spindle 50.

In setting up the pantograph mechanism 17, the distance between pivot points 52 and 59 is equal to the distance between pivot points 62 and 47; the distance between points 59 and 54 is equal to the distance between the points 54 and 62; the distance between points 42 and 54 is equal to the distance between the points 54 and 40; and the distance between points 52 and 42 is equal to the distance between the points 40 and 47. When these distances are established, movement of the tracer spindle 45 is followed by equal and corresponding movement of the cutter spindle 50 in a horizontal direction.

The drive mechanism 18 includes a vertically mounted motor drive means 19, which preferably is a variable speed D.C. electric motor (FIG. 4). The motor 19 is fixed to a motor bracket 63 which is fastened onto the base 11. The motor bracket 63 also includes an extension 64 extending inwardly toward the work table 14. The motor 19 includes a shaft 65 and a drive pulley 66 fixed thereto. The pulley 66 has grooves in the base which are adapted to receive lugs or teeth on a steel cable reinforced rubber drive belt 67. The belts 67 are known as Wood's "Timing" belt device and do not slip under heavy cutting loads. The belts 67 are available from T. B. Wood's Sons Company of Chambersburg, Pennsylvania. Ordinarily round nylon cord belts and stepped variable diameter pulleys are used with a constant speed motor. The present invention uses notched constant diameter pulleys and a variable speed motor in combination with the lugged belts to eliminate the slippage which often occurred when a heavy load was combined with a small diameter drive pulley.

The rotation of the motor shaft 65 must be transferred to cutter spindle 50. To do this, the motion must not only be transferred laterally, but also vertically, since the motor drive pulley 66 is vertically spaced from a driven pulley 68 keyed to the cutter spindle 50. Also, the drive pulley 66 is fixed both vertically and horizontally, whereas the cutter spindle pulley 68 is movable both vertically and horizontally.

Vertical motion transmitter means 69 (shown in FIGS. 4-6) is adapted to transmit the rotative motion from the motor pulley 66 in a vertical direction to the cutting spindle pulley 68 while the cutting spindle is moved in vertical and horizontal directions. When lugged drive belts are used, the belts must be maintained parallel to the base of the pulley to achieve satisfactory operation, whereas with variable diameter pulleys and round belts, the belts can be canted to compensate for the vertical movement of the cutting spindle.

The vertical motion transmitter 69 includes a vertically positioned outer spindle 70 having each of its ends 71 and 72 necked down and rotatively housed in a pair of bracket arms 73 and 74 fixed to the motor bracket extension 64. A pulley 75 is fixed to the lower end 71 of the outer spindle 70 adjacent to its connection to the bracket arm 73. The pulley 75 receives the belt 67 which is driven by the motor drive pulley 66, and rotates the outer spindle at a speed dependent upon the speed of the motor 19. The outer spindle 70 is provided with an opening 76 in its lower end 71, a counterbore 77 in its upper end 72 and an enlarged cavity 78 therebetween. The cavity 78 is an open sided slot formed completely through the outer spindle 70 intermediate of and in communication with the opening 76 and the counterbore 77.

An inner spindle 79 is housed in the outer spindle 70 and is vertically movable therein through the opening 76, the slot 78 and the counterbore 77. Linear ball bearing assemblies 80 permit relatively frictionless vertical movement of the inner spindle 79 in the outer spindle 70. An opening 82 aligned with the outer spindle slot 78 is provided through the inner spindle 79. A torque pin 83 having end mounted ball bearings assemblies 84 affixed to either end thereof is positioned in the inner spindle opening 82 and the bearing assemblies 84 ride in the outer spindle slots 78.

Thus, the inner spindle 79 is rotatably locked to the outer spindle 70, but the inner spindle 79 is axially and vertically movable relative to the outer spindle 70.

Therefore, the rotative motion from the motor pulley 66 is transmitted to the inner spindle 79 through the pulley 75 and the outer spindle 70. Since the inner spindle 79 is axially slidable in the outer spindle 70, the rotative motion impacted to the inner spindle can be further transmitted from different vertical positions of the inner spindle 79.

The inner spindle 79 has an end extension 85 extending upward from the outer spindle upper end 72. The inner spindle end 85 is rotatively fixed to a lifting bar bracket 86 fastened to one end of a lifting bar 87. An arm 88 is removably fastened by screws 89 to the other end of the bar 87. The arm 88 is pivotally connected to the member 56 and to the cutter spindle bracket 51 at the pivot 52.

Therefore, the inner spindle 79 is positively connected to the pantograph mechanism 17 and is vertically movable with the horizontal movement 16.

A driven grooved pulley 90 is keyed to the inner spindle end extension 85 to rotate therewith and is positioned adjacent to the lifting bar bracket 86. A lugged rubber belt drive 91 connects the pulley 90 with the pulley 68 fixed to the cutter spindle 50. Thus, the rotation of the motor shaft 65 is transmitted to the cutter spindle 50 through the drive pulley 66, the belt drive 67, the pulley 75, the outer spindle 70, the inner spindle 79, the pulley 90, the belt drive 91 and the pulley 68.

As the pulley 90 is fixed to the inner spindle 79 and the pulley 68 is fixed to the cutter spindle 50 and the inner spindle 79 moves vertically with the cutter spindle 50 because of the lifting bar 87, the belt 79 is maintained in its original parallel alignment with the base 11. When the cutter spindle is moved in a vertical direction, the inner spindle 79 moves axially within the outer spindle 70, but continues to rotate therewith because of the connection of the torque pin 83 and the end bearings 84.

The speed of the cutting spindle 50 ordinarily varies from 800–10,000 r.p.m. However, for fine line engraving and polishing operations with carbide cutters, it is necessary that a higher speed cutter be used. Under these circumstances, the cutter spindle 50 is removed from the opening 49 in the cutter spindle housing 48 and an electrically actuated spindle and cutter 50a shown in FIG. 9 is inserted in the opening 49. The spindle 50a has a speed of rotation of about 34,000 r.p.m.

Since the polisher 50a has a self contained electric motor, the drive and vertical movement connection to the motor 19 is not necessary, and consequently the lifting bar 87 is disconnected from the pantograph mechanism 17 by removing the screws 89 and disconnecting the arm 88 from the bar 87.

When the operator stands in front of the base 11 he is presented with a clear view of both the model and the work piece, since these are fixed to the tracer table 13 and to the cutter table 14 and the tables themselves are at about a 45° angle to the front of the machine 10. Present machines ordinarily align the model with the work piece, and thus one of the two often is far removed from the operator.

Also, the tracer spindle 45 and the cutter spindle 50 are positioned in close proximity to the center of the machine 10 and equidistant on either side of the vertical movement 15 which eliminates a considerable portion of the vibration and jumping which often occurs when either the cutter or the tracer is far removed from the main horizontal pivot point, as is often the situation when a bar or beam is used which is pivoted at one end with the cutter and tracer positioned out on the beam.

A further improvement in the present invention is shown in FIGS. 7 and 8 and includes a left hand actuator assembly 92 for the vertical movement 15. The assembly 92 includes a hand lever 93 pivoted at one end 94 to a bracket 95 mounted on the underside of the base 11. A finger 96 is fastened to the underside of the bottom cross beam 26 of the vertical movement 15 and is aligned with the handle 93. A bracket 97 is pivoted at 98 to the lever 93 between its ends and is slidable on the finger 96.

Thus, the lever 93 is pivotally connected to the base 11 and there is a slidable pivot connection between the vertical movement 15 and the lever 93. The slidable bracket 97 is necessary because the pivot point 98 moves closer to the bottom cross beam 26 as the vertical movement 15, including the cross beam 26, moves upwardly.

By means of the actuator assembly 92, the operator can operate the horizontal movement 16 with his right hand and the vertical movement 15 with his left hand. This often is of considerable importance, since an operator standing at such a machine for eight hours or more will have considerable fatigue in one hand while the other hand is doing almost nothing. The present invention obviates this difficulty in a compact and effective manner.

Another advantage of the present machine is that the machine center, defined by the centers of the front pin 27, the pivot 38, the fulcrum stud 53 and the pivot 54, is the center of the horizontal movement 16, the fulcrum of the pantograph assembly 17 and is on the center line of the vertical movement 15.

A bracket 99 houses a micrometer stop 100 which engages a tongue 101 on the top cross beam 25 to limit vertical movement to a predetermined point.

Thus, the operator is given three different independent adjustments of the vertical height of the stylus with respect to the cutter. The tracer table 13 can be adjusted, the position of the tracer spindle 45a can be adjusted by the micrometer nut 45d, and the micrometer stop 100 can be adjusted to limit vertical movement. These adjustments are necessary when a cavity is being traced in toughened steel to allow the cutter to form the cavity in small increments, while still tracing the outline of the cavity with the stylus.

Horizontal movement is provided by the operator grasping the tracer oscillator 39 and moving the tracer quill 45 over the copy master.

The impeller beam 36 preferably has about 90–100° rotative movement, while each of the oscillators 39 and 41 has about 120° rotative movement.

Thus it is seen that the present invention provides a three-dimensional reproducing machine which achieves all the objects and advantages sought therefor.

This invention is intended to cover all changes and modifications of the examples of the invention herein chosen for purposes of the disclosure, which do not constitute departures from the spirit and scope of the invention.

What is claimed is:

1. A three-dimensional reproducing machine comprising a base, a tracer table, a work table, means adapted for vertical movement vertically movable in linear ball bushings housed in said base, means adapted for horizontal movement pivotally carried by said vertical movement means and movable therewith, said horizontal movement means including a beam pivotally supporting a tracer spindle and a cutter spindle, means synchronizing the movement of said tracer and cutter spindles in two horizontal directions, drive means at a different vertical elevation from said cutter spindle, and a drive transmission for communicating the rotary motion from said drive means to said cutter spindle, said drive transmission including grooved constant diameter pulleys on said cutter spindle and said drive means, a vertical motion transmitting assembly including a pair of spindles rotatable in common and longitudinally relatively movable, grooved constant diameter pulleys on each of said spindles, a first belt having lugs engageable with the pulley grooves connecting the drive means pulley with the pulley on one of said spindles, a second belt having lugs engageable wtih the pulley grooves connecting the cutter spindle pulley with the pulley on the other of said spindles, and means for vertically shifting the spindles with respect to each other, said means being tied to the vertical motion of said cutter spindle, whereby the belts are maintained in constant horizontal alignment.

2. A three-dimensional reproducing machine comprising a base, a tracer table, a work table, said tables being angularly aligned with respect to the front of the machine, means adapted for vertical movement centered between said tables, said vertical movement means including linear ball bearing assemblies positioned in said table, top and bottom cross beams positioned above and below the tables, pins connecting the cross beams, said pins being vertically movable in said linear ball bearing assemblies, and a hand actuated lever pivoted to the base and pivotally and slidably connected to the vertical movement means to raise and lower said vertical movement means, means adapted for horizontal movement including a propeller beam pivoted at its center to the vertical movement means and supported by said vertical movement means, oscillators pivotally housed in the ends of said propeller beam, a tracer spindle positioned in one of said oscillators and vertically aligned with the tracer table, a cutter spindle positioned in the other of said oscillators and vertically aligned with the work table, pantograph means for synchronizing horizontal movement of said tracer and cutter spindles including a series of arms pivotally interconnected to form a parallelogram linkage movable in two dimensions about a main pivot point vertically aligned with the vertical movement, one of said arms having an extension pivotally connected to the tracer oscillator in vertical alignment with the tracer spindle, the parallel arm being pivotally connected intermediate its ends to the cutter oscillator in vertical alignment with the cutter spindle, a cross arm of said parallelogram linkage being pivotally connected to said horizontal movement means at the main pivot point, said arms being dimensioned so as to maintain the tracer spindle, the main pivot, and the cutter spindle in a straight line, variable speed drive means, a drive pulley on said drive means, a driven pulley on said cutter spindle, said pulleys being maintained at different variable elevations during operation of the machine, means for transmitting rotative motion from said drive means to said cutter spindle including a bracket, a first spindle rotatably housed in said bracket, a pulley fixed to said first spindle and horizontally aligned with the drive pulley, a belt connecting said pulleys, said first spindle being provided with an open-ended bore, a second spindle axially movable in said bore, means limiting said first and second spindles to common rotative motion while permitting relative axial motion, a pulley fixed to said second spindle and horizontally aligned with the driven pulley on said cutter spindle, a belt connecting said pulleys, and means for effecting vertical movement of said second spindle, said means being pivotally linked to the pantograph mechanism at a point vertically aligned with the cutter spindle, whereby said pulley belts are maintained in horizontal alignment during vertical movement of said cutter spindle and tension in said belts is maintained during horizontal movement of said cutter spindle.

3. A three-dimensional reproducing machine comprising a base, a tracer table, a work table, means adapted for vertical movement vertically movable with respect to said base, means adapted for horizontal movement pivotally carried by said vertical movement and movable therewith, said horizontal movement means including a beam pivotally supporting a tracer spindle and a cutter spindle, pantograph means synchronizing the movement of said tracer and cutter spindles in two horizontal directions, drive means at a different vertical elevation from said cutter spindle, and a drive transmission for communicating the rotary motion from said drive means to said cutter spindle, said drive transmission including a bracket, a first spindle rotatably housed in said bracket, a pulley fixed to said first spindle and horizontally aligned with the drive pulley, a belt connecting said pulleys, said first spindle being provided with an open-ended bore, a second spindle axially movable in said bore, means limiting said first and second spindles to common rotative motion which permits relative axial motion, a pulley fixed to said second spindle and horizontally aligned with the driven pulley on said cutter spindle, a belt connecting said pulleys, and means for effecting vertical movement of said second spindle, said means being pivotally linked to the pantograph mechanism at a point vertically aligned with the cutter spindle, whereby said pulley belts are maintained in horizontal alignment during vertical movement of said cutter spindle and tension in said belts is maintained during horizontal movement of said cutter spindle.

References Cited in the file of this patent

UNITED STATES PATENTS

| | | |
|---|---|---|
| 6,310 | Singer | Apr. 10, 1849 |
| 1,918,696 | Gilbert | July 18, 1933 |
| 2,176,193 | Zwick | Oct. 17, 1939 |
| 2,552,038 | Etzler | May 8, 1951 |
| 2,610,404 | Compton | Sept. 16, 1952 |
| 2,645,161 | Stuart et al. | July 14, 1953 |
| 2,961,899 | Grove et al. | Nov. 29, 1960 |
| 3,000,270 | Gunderson | Sept. 19, 1961 |